(12) United States Patent
Harvey

(10) Patent No.: US 7,034,674 B2
(45) Date of Patent: Apr. 25, 2006

(54) HOUR METER WITH INCREMENTAL SERVICE INDICATOR

(75) Inventor: Arthur James Harvey, Mantua, OH (US)

(73) Assignee: Delta Systems, Inc., Streetsboro, OH (US)

( * ) Notice: Subject to any disclaimer, the term of this patent is extended or adjusted under 35 U.S.C. 154(b) by 72 days.

(21) Appl. No.: 10/781,095

(22) Filed: Feb. 18, 2004

(65) Prior Publication Data

US 2004/0164857 A1 Aug. 26, 2004

Related U.S. Application Data

(60) Provisional application No. 60/449,741, filed on Feb. 24, 2003.

(51) Int. Cl.
*B60Q 1/00* (2006.01)

(52) U.S. Cl. .............................. 340/457.4; 340/815.4; 340/815.5

(58) Field of Classification Search ............ 340/457.4, 340/815, 309.16–309.9, 815.53, 815.59, 340/815.64, 815.44; 701/30; 345/33, 35–54
See application file for complete search history.

(56) References Cited

U.S. PATENT DOCUMENTS

| | | | | |
|---|---|---|---|---|
| 3,992,070 | A | 11/1976 | Dunn et al. | 39/346 |
| 4,129,037 | A | 12/1978 | Toalson | 73/152.61 |
| 4,144,862 | A | 3/1979 | Estkowski | 123/196.5 |
| 4,181,883 | A | 1/1980 | Beeghly et al. | 324/166 |
| 4,187,927 | A | 2/1980 | Byrne | 182/2.4 |
| 4,280,457 | A | 7/1981 | Bloxham | 123/198 R |
| 4,478,521 | A * | 10/1984 | Evans et al. | 368/8 |
| 4,539,632 | A * | 9/1985 | Hansen et al. | 700/14 |
| 4,612,623 | A * | 9/1986 | Bazarnik | 702/177 |
| 4,613,939 | A | 9/1986 | Paine | 701/35 |
| 4,617,639 | A * | 10/1986 | Paine | 701/35 |
| 4,642,787 | A | 2/1987 | McCarthy et al. | 702/165 |
| 4,688,117 | A * | 8/1987 | Dwyer et al. | 360/72.3 |
| 4,729,743 | A | 3/1988 | Farrar et al. | 439/276 |
| 4,742,297 | A | 5/1988 | Heaton et al. | 324/166 |
| 4,912,458 | A * | 3/1990 | Comeau et al. | 340/576 |
| 4,985,875 | A | 1/1991 | Mitchell | 368/5 |
| 5,065,320 | A | 11/1991 | Hayashi et al. | 701/1 |
| 5,121,368 | A | 6/1992 | Polydoris et al. | 368/9 |

(Continued)

OTHER PUBLICATIONS 5 page website of Sendec Corporation, www.sendec.com/meters/html/8xx100.html (visited Mar. 4, 2003).

(Continued)

*Primary Examiner*—Daniel Wu
*Assistant Examiner*—Son Tang
(74) *Attorney, Agent, or Firm*—Watts Hoffmann Co., LPA

(57) ABSTRACT

An hour meter having a display that provides a visual indication of a total time an engine has operated and a visual indication of engine operation time remaining in a predetermined service time interval. A plurality of segments on the display are selectively displayed in a first optical state or a second optical state. A display drive displays the segments in the first optical state at a beginning of a predetermined service interval. The drive changes the optical state of a first segment from the first optical state to the second optical state when a given portion of the predetermined service time interval has elapsed. The drive incrementally changes the state of a remainder of the plurality of segments from the first optical state to said second optical state as additional portions of the predetermined service time interval elapse to graphically display the amount of engine operation time remaining in the predetermined service time interval.

23 Claims, 10 Drawing Sheets

U.S. PATENT DOCUMENTS

| | | | | |
|---|---|---|---|---|
| 5,138,995 | A | | 8/1992 | Erhard .................. 123/335 |
| 5,150,568 | A | | 9/1992 | White .................... 360/797 |
| 5,153,580 | A | * | 10/1992 | Pollack ............... 340/825.25 |
| 5,278,357 | A | | 1/1994 | Yamanashi ............. 174/151 |
| 5,375,977 | A | | 12/1994 | Hill ........................ 416/61 |
| 5,408,224 | A | * | 4/1995 | Yamazaki et al. ........ 340/679 |
| 5,642,284 | A | | 6/1997 | Parupalli et al. .......... 701/30 |
| 5,644,491 | A | | 7/1997 | Fiske et al. .............. 701/102 |
| 5,730,098 | A | | 3/1998 | Sasaki et al. ........ 123/198 DB |
| 5,857,159 | A | | 1/1999 | Dickrell et al. ........... 701/35 |
| 5,869,776 | A | | 2/1999 | Vuong et al. ............ 73/866.3 |
| 5,913,911 | A | | 6/1999 | Beck et al. ............... 104/279 |
| 6,141,629 | A | * | 10/2000 | Yamamoto et al. ....... 702/187 |
| 6,225,907 | B1 | * | 5/2001 | Derryberry et al. ....... 340/584 |
| 6,377,168 | B1 | | 4/2002 | Harvey .................... 340/439 |
| 6,490,543 | B1 | * | 12/2002 | Jaw ......................... 702/184 |
| 6,500,027 | B1 | | 12/2002 | Van Der Sanden et al. . 439/587 |
| 6,655,975 | B1 | * | 12/2003 | Liedtke .................... 439/276 |

OTHER PUBLICATIONS 3 page website of Honeywell Inc., www.hobbs-corp.com/callbr3.asp (visited Mar. 4, 2003).

2 page website of ENM Company, www.enmco.com:7786/cnm.catalog/scan/se+iresult/sf+search/if+series/s (visited Mar. 4, 2003).

2 page product information of Curtis Instruments, Inc., Model 700H (2001).

7 page product information of Curtis Instruments, Inc., 700 Series Solid State Hours Meters & Counters (2002).

2 page product information of Curtis Instruments, Inc., 730 Series Mini-Cluster (1999).

2 page product information of Curtis Instruments, Inc., Model 732K (2001).

3 page website of ENM Counting Instruments, http://www.enmco.com/home/lop.html (visited Feb. 2, 2004).

3 page website of Honeywell Inc., http://content.honeywell.com/sensing/hss/hobbscorp/catl_hr3.asp (visited Feb. 2, 2004).

4 page website of Sendec Corporation, http://www.sendec.com/meters/html/80610x.html (visited Feb. 2, 2004).

2 page product information of ENM Company, Engine Powered Hour Meter, Series T60 (2002).

2 page product information of Curtis Instruments, Inc., Model 3000R (2002).

* cited by examiner

HOUR METER WITH INCREMENTAL SERVICE INDICATOR

This application claims the benefit of Provision application Ser. No. 60/449,741, filed Feb. 24, 2003.

TECHNICAL FIELD

The present invention relates generally to hour meters and, more particularly, the present invention relates to an hour meter that provides a graphic indication of engine operation time remaining in a service time interval.

BACKGROUND ART

Hour meters of various types are commercially available both as an add on device to a combustion engine or supplied as part of a vehicle that has a combustion engine. The hour meter provides information about the amount of time the engine has been operating. This information is useful for scheduling maintenance necessary at predetermined engine run times. In addition, hour meters may be used on test vehicles to calculate the durability of engine components as a function of engine run time.

Some existing hour meters display a service reminder icon at the end of predetermined intervals, such as scheduled maintenance intervals. In some hour meters, the display can be reset to remove the service reminder icon by the operator after service is performed. In other hour meters, the display resets after a predetermined period of time elapses.

One problem with the service reminder provided by current hour meters is that the service reminder icon does not provide the operator with an indication of how much time is left until service, since the service reminder icon is not displayed until service is due. In addition, if service is performed before the service reminder icon is displayed, the service reminder icon will be displayed shortly after service is performed. This could lead to confusion and could possibly cause the vehicle to be unnecessarily serviced.

There is a need for an hour meter that graphically displays the amount of time left until service is due. Such an hour meter allows the operator to see at a glance how much time is left until the next scheduled service.

DISCLOSURE OF THE INVENTION

The present invention relates to an hour meter having a display that provides a visual indication of a total time an engine has operated and a graphic indication of engine operation time remaining in a predetermined service time interval. A plurality of segments that provide the visual indication of the time remaining in the service interval are selectively displayed in a first optical state or a second optical state. A display drive displays the segments in the first optical state at a beginning of a predetermined service interval. The drive changes the optical state of a first segment from the first optical state to the second optical state when a given portion of the predetermined service time interval has elapsed. The drive incrementally changes the state of the remainder of the segments from the first optical state to the second optical state as additional portions of the service time interval elapse to visually display the amount of engine operation time remaining in the service time interval.

In one embodiment, the drive maintains the segments in the second optical state while the remainder of the service time interval elapses and additional segments are changed to the second optical state. This may provide the visual appearance of a bar graph or a pie graph. In another embodiment, the drive changes a segment in the second optical state back to the first optical state when the next portion of the service time interval elapses and the next segment changes from the first optical state to the second optical state. This may provide the visual appearance of a sweeping hand of an analog clock or a needle of a gauge.

In one embodiment, all of the segments are displayed in the second optical state when the predetermined service time interval has elapsed. The segments may remain in the second optical state for a predetermined engine operation time after the service time interval elapses to provide a visual reminder that service is due. The drive may reset the segments to the first optical state when the predetermined engine operation time elapses after the service time interval has elapsed. The drive then incrementally changes the segments to the second optical state to graphically display the amount of engine operation time remaining in a next service interval.

In one embodiment, the hour meter includes a switch for manually resetting the service time interval and for resetting the segments to the first optical state. In this embodiment, the drive may automatically reset the plurality of segments to the first optical state if the switch is not actuated and a predetermined engine operation time elapses after the predetermined service time interval elapsed.

Additional features of the invention will become apparent and a filler understanding obtained by reading the following detailed description in connection with the accompanying drawings.

BEST MODE FOR CARRYING OUT THE INVENTION

Figure 1A:
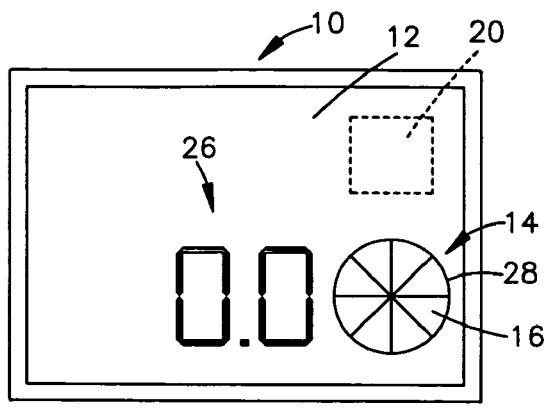
FIG. 1A is a schematic representation of an hour meter with a plurality of segments for providing a graphic indication of a time remaining in a service interval in a first optical state.

The present invention concerns an hour meter 10 having a display 12 that provides a visual indication of a total time an engine has operated and a graphic indication of engine operation time remaining in a predetermined service time interval. A plurality of segments 14 are presented on the display. Each of the segments 14 are selectively displayed in a first optical state 16 or a second optical state 18. The hour meter 10 includes a display drive 20 that displays the plurality of segments in the first optical state at a beginning of a predetermined service interval. The drive 20 changes the optical state of a first segment 22 from the first optical state 16 to the second optical state 18 when a given portion of the predetermined service time interval has elapsed. The drive incrementally changes the state of a remainder 24 of the segments from the first optical state to the second optical state as additional portions of the predetermined service time interval elapse to graphically display the amount of engine operation time remaining in the predetermined service time interval.

Figure 20:
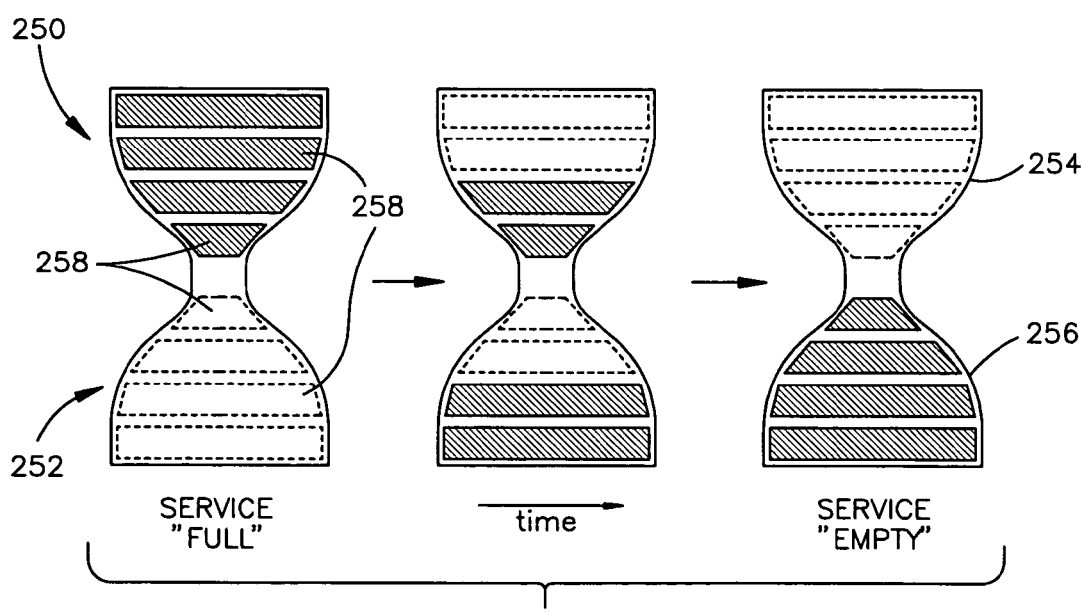
FIG. 20 is a schematic representation of an hour glass shaped service indicator.

Referring to the Figures, the illustrated display 12 provides the visual indication of the total time the engine has operated with numeric characters 26. The plurality of segments 14 provide the graphic indication of engine operation time remaining in a service time interval. In the embodiments illustrated by FIGS. 1A–16A, the segments form a pie graph 28. In the embodiments illustrated by FIGS. 1B–16B, the segments form a bar graph. It should be readily apparent that the segments could form any other shape or icon. For example, FIG. 20 illustrates that the segments could be configured to form an hourglass.

One type of display that may be used is a liquid crystal display. In the illustrated embodiment, the first optical state 16 is a light state and the second optical state 18 is a darkened state. In the illustrated embodiment, all of the segments 14 are initially in the light state and are incrementally changed to the dark state. This gives the visual effect of a graph that incrementally fills as the service time interval elapses. It should be readily apparent that the segments could all initially be in the dark state and could be incrementally changed to the light state. This gives the visual effect of an initially full graph that incrementally empties as the service time interval elapses. In another embodiment, a segment in the dark optical state is changed back to the light state when the next portion of the service time interval elapses and the next segment changes from the light state to the dark state. This provides the visual appearance of a sweeping hand of an analog clock or a needle of a gauge.

Figure 17:
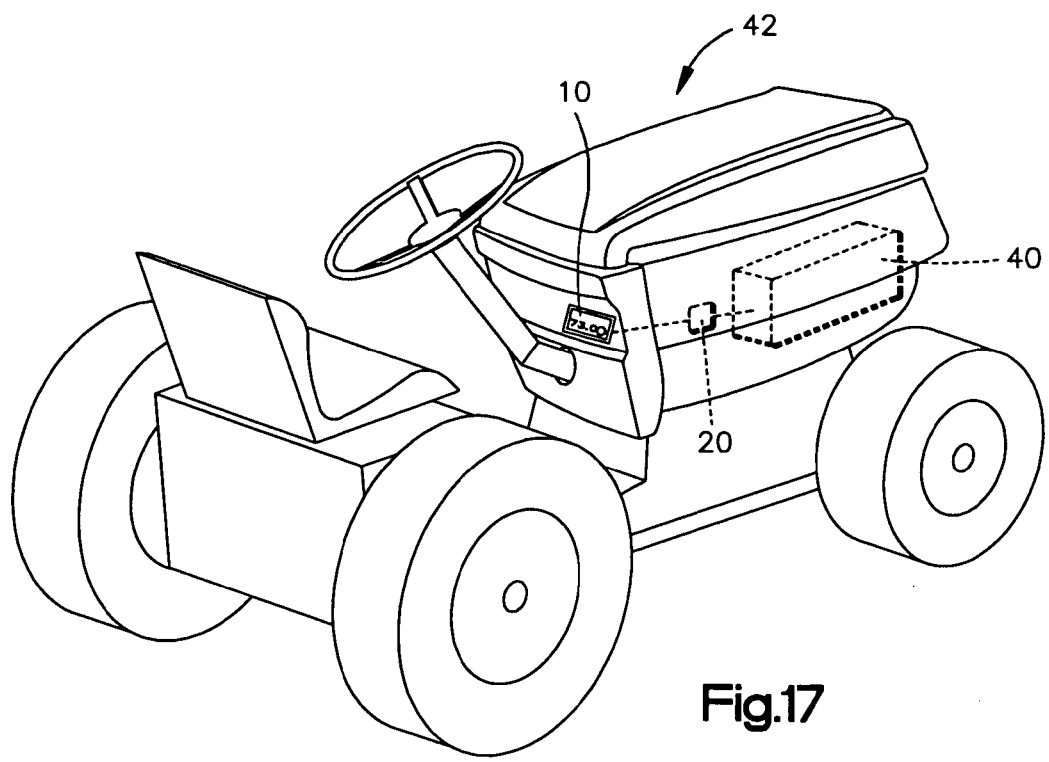
FIG. 17 is a schematic representation of an hour meter coupled to an engine of a vehicle.

In the Figures, for illustrative purposes only, the predetermined service time interval is eighty hours of engine operation and the display defines eight segments. It should be apparent that the predetermined service time interval could be any recommended service time interval for any given engine and any number of segments could be displayed. In the examples provided by the Figures, each of the eight segments 14 represent a portion of the predetermined service time interval that is equal to ten hours of engine operation. In the exemplary embodiment, the hour meter is connected to an engine 40 (FIG. 17) of a vehicle 42, such as a lawn and garden tractor.

Figure 1B:
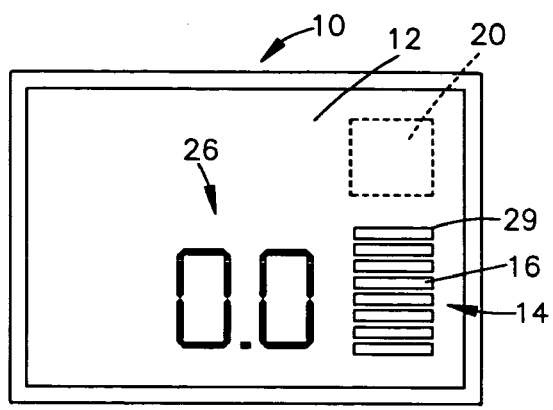
FIG. 1B is a schematic representation of an hour meter with a plurality of segments for providing a graphic indication of a time remaining in a service interval in a first optical state.

Referring to FIGS. 1A and 1B, the numeric characters 26 are initially set to zero and all of the portions 14 are in the first optical state 16. This will typically be the case when the hour meter 10 is first connected to an engine 40, such as when a vehicle 42 is manufactured.

Figure 2A:
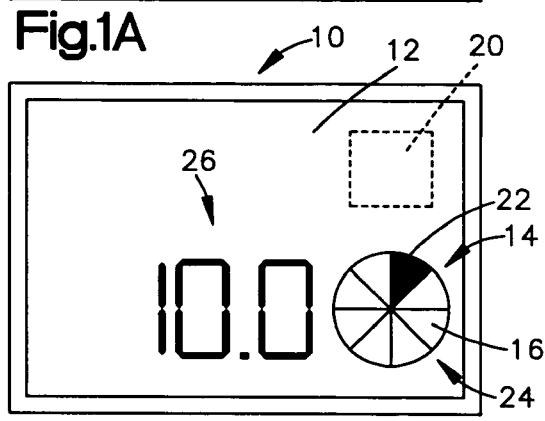
FIG. 2A is a schematic representation of an hour meter with one segment in a second optical state to provide a graphic indication of a time remaining in a service interval.
Figure 2B:
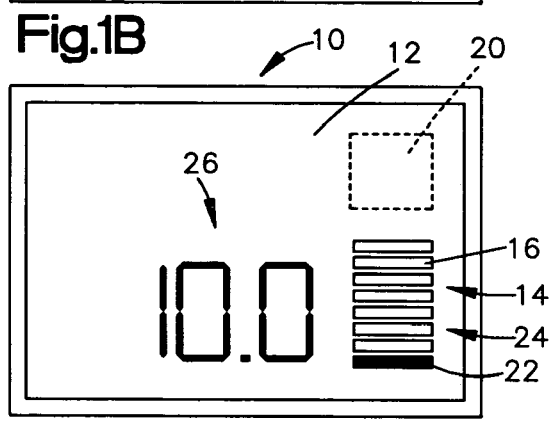
FIG. 2B is a schematic representation of an hour meter with one segment in a second optical state to provide a graphic indication of a time remaining in a service interval.
Figure 3A:
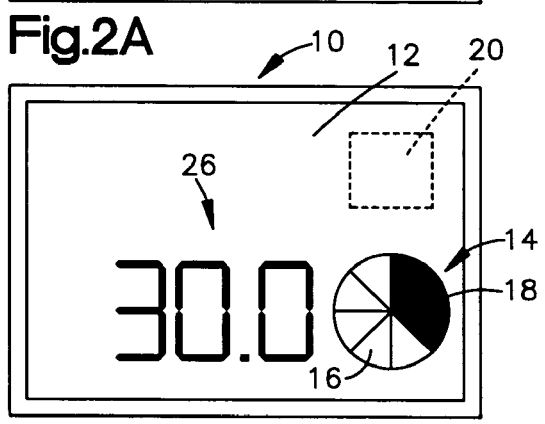
FIG. 3A is a schematic representation of an hour meter with three segments in a second optical state to provide a graphic indication of a time remaining in a service interval.
Figure 3B:
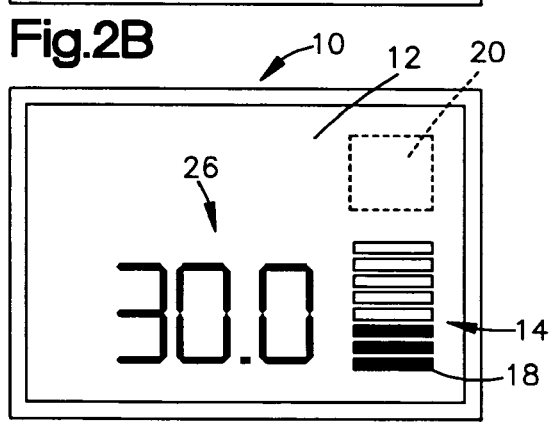
FIG. 3B is a schematic representation of an hour meter with three segments in a second optical state to provide a graphic indication of a time remaining in a service interval.
Figure 4A:
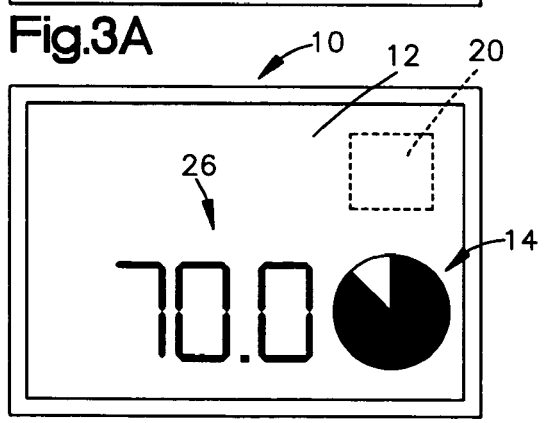
FIG. 4A is a schematic representation of an hour meter with seven segments in a second optical state to provide a graphic indication of a time remaining in a service interval.
Figure 4B:
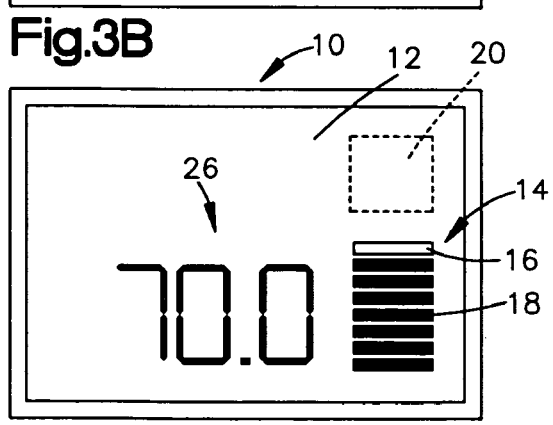
FIG. 4B is a schematic representation of an hour meter with seven segments in a second optical state to provide a graphic indication of a time remaining in a service interval.
Figure 5A:
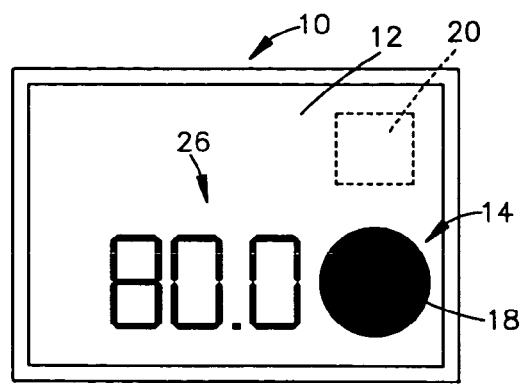
FIG. 5A is a schematic representation of an hour meter with all of the segments in a second optical state to provide a graphic indication that service is due.
Figure 5B:
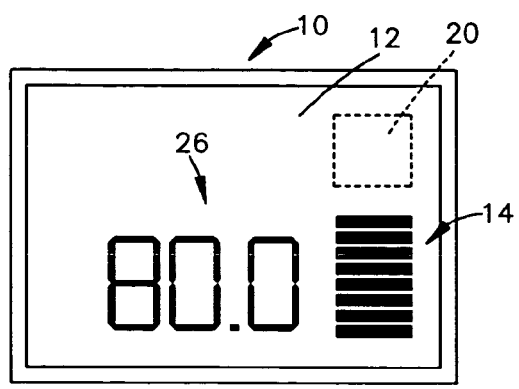
FIG. 5B is a schematic representation of an hour meter with all of the segments in a second optical state to provide a graphic indication that service is due.
Figure 6A:
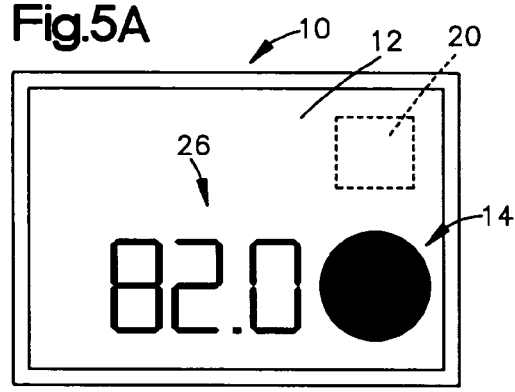
FIG. 6A is a schematic representation of an hour meter with all of the segments in a second optical state to provide a graphic indication that service is due.
Figure 6B:
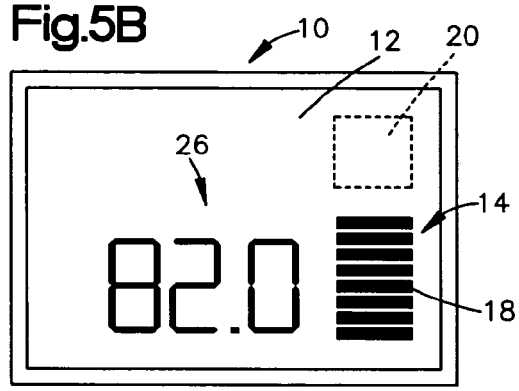
FIG. 6B is a schematic representation of an hour meter with all of the segments in a second optical state to provide a graphic indication that service is due.
Figure 7A:
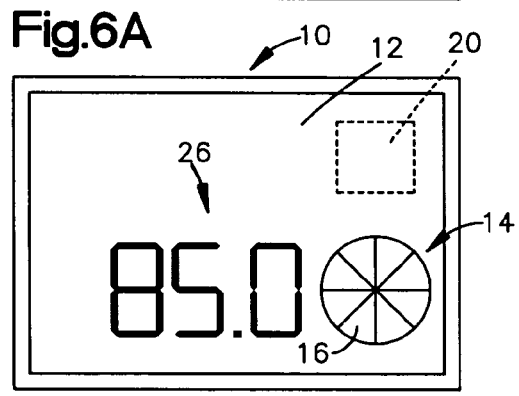
FIG. 7A is a schematic representation of an hour meter with a plurality of segments reset to the first optical state.
Figure 7B:
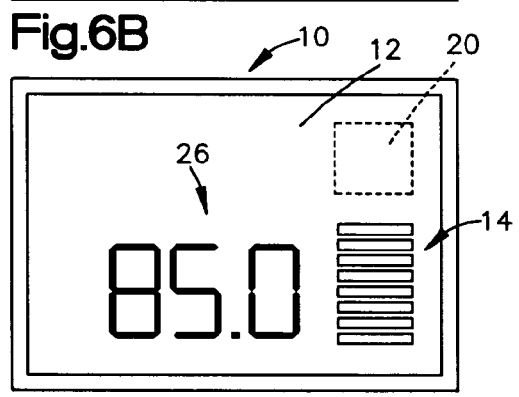
FIG. 7B is a schematic representation of an hour meter with a plurality of segments reset to the first optical state.

Referring to FIGS. 2A and 2B the first segment 22 changes from the first optical state 16 to the second optical state 18 when the engine has operated for ten hours. Referring to FIGS. 3A and 3B three segments 14 are in the second state 18 when the engine has operated for thirty hours. Referring to FIGS. 4A and 4B seven segments 14 are in the second state 18 when the engine has operated for seventy hours. Referring to FIGS. 5A and 5B all eight segments are in the second optical state when the eighty hour service time interval elapses. In the illustrated embodiment, the segments remain in the second optical state for a period of time to provide a reminder that service is due. For example, in FIGS. 6A and 6B all of the segments 14 are still in the second optical state 18 when the engine has operated for eighty-two hours. The drive resets the plurality of segments 14 back to the first optical state 16 when a predetermined engine operation time after the service time interval elapses. For example, in FIGS. 7A and 7B all of the segments 14 have been reset by the drive to the first optical state 16 when the engine has operated for eighty-five hours.

Figure 8A:
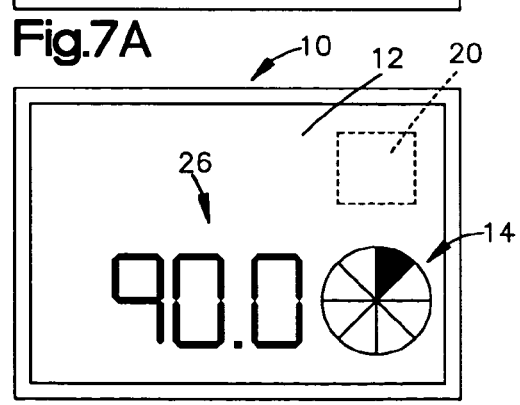
FIG. 8A is a schematic representation of an hour meter with one segment in a second optical state to provide a graphic indication of a time remaining in a service interval.
Figure 8B:
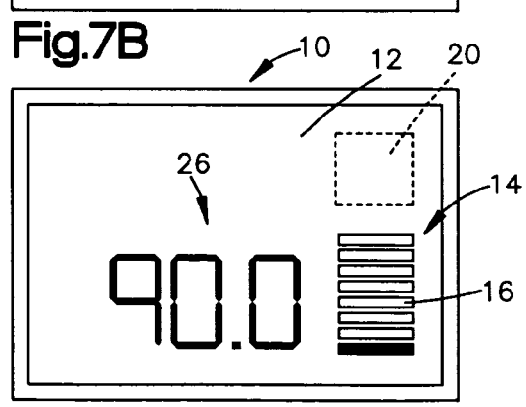
FIG. 8B is a schematic representation of an hour meter with one segment in a second optical state to provide a graphic indication of a time remaining in a service interval.
Figure 9A:
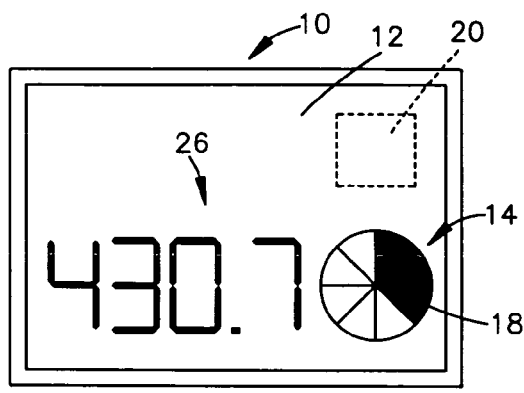
FIG. 9A is a schematic representation of an hour meter with three segments in a second optical state to provide a graphic indication of a time remaining in a service interval.
Figure 9B:
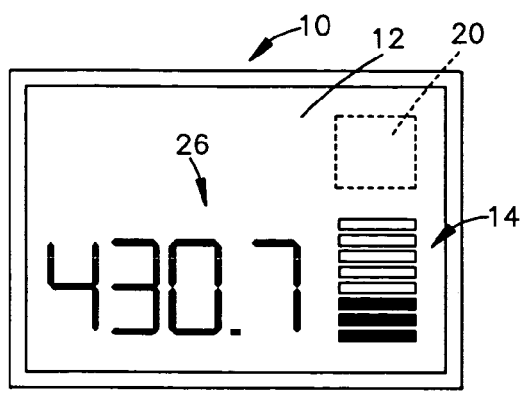
FIG. 9B is a schematic representation of an hour meter with three segments in a second optical state to provide a graphic indication of a time remaining in a service interval.

In the exemplary embodiment, a new service time interval begins at the end of the previous service time interval. In the example provided by FIGS. 1A–8A and 1B–8B a new service time interval begins when the engine has operated for eighty hours. Referring to FIGS. 8A and 8B the first segment 22 changes from the first optical state 16 to the second optical state 18 when the engine has operated for ten hours after the new service interval began or a total of ninety hours. The plurality of segments continue to cycle in this manner to provide a graphic indication of the amount of engine operation time remaining in each service interval. For example, FIGS. 9A and 9B illustrate that three segments 14 are in the second optical state when the engine has operated for 430.7 hours.

FIGS. 10A–16A and 10B–16B illustrate an embodiment where the hour meter 10 includes a switch 46 for manually resetting the service time interval and the plurality of segments to the first optical state. In the exemplary embodiment, the drive 20 automatically resets the segments to the first optical state if the switch is not actuated and a given engine operation time elapses after the service time interval elapses.

Figure 10A:
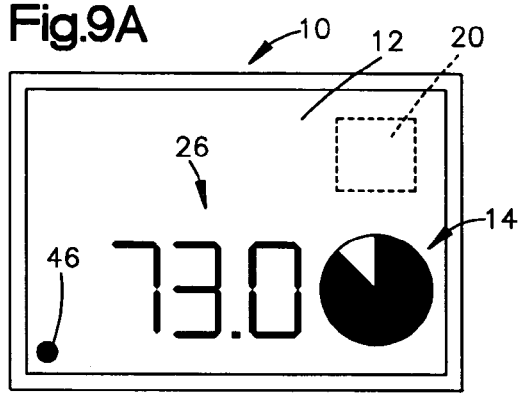
FIG. 10A is a schematic representation of an hour meter with seven segments in a second optical state to provide a graphic indication of a time remaining in a service interval.
Figure 10B:
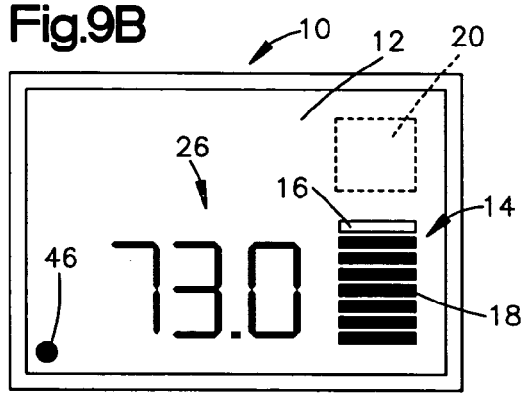
FIG. 10B is a schematic representation of an hour meter with seven segments in a second optical state to provide a graphic indication of a time remaining in a service interval.
Figure 11A:
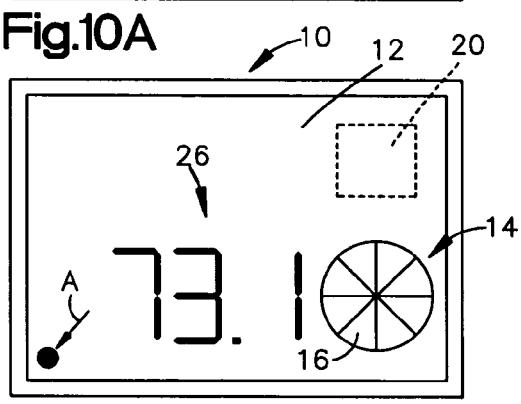
FIG. 11A is a schematic representation of an hour meter with a plurality of segments reset to the first optical state.
Figure 11B:
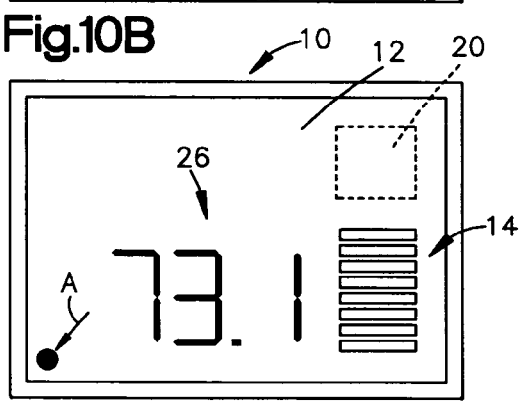
FIG. 11B is a schematic representation of an hour meter with a plurality of segments reset to the first optical state.
Figure 12A:
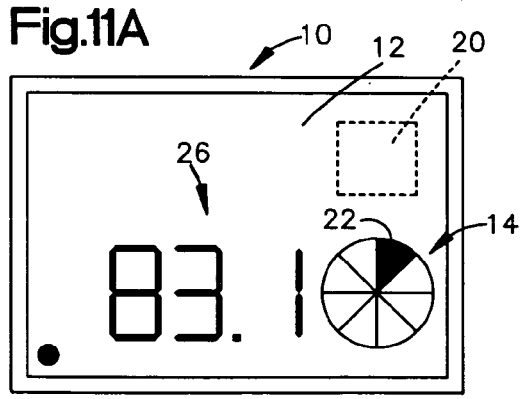
FIG. 12A is a schematic representation of an hour meter with a one segment in a second optical state to provide a graphic indication of a time remaining in a service interval.
Figure 12B:
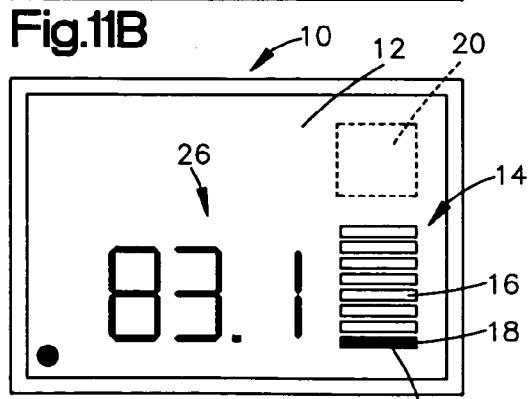
FIG. 12B is a schematic representation of an hour meter with a one segment in a second optical state to provide a graphic indication of a time remaining in a service interval.

FIGS. 10A and 10B show seven segments in the second optical state 18 when the engine has operated for seventy-three hours. The arrow A in FIGS. 11A and 11B represents a user actuating the reset switch 46. Typically, the user will actuate the reset switch when the service required at the end of the service interval has been performed. When the reset switch is actuated, the segments 14 are reset to the first optical state as shown in FIGS. 11A and 11B and the service time interval is reset. In the example provided by 11A–12A and 11B–12B a new service time interval begins when the reset switch is actuated.

The segments incrementally change from the first optical state to the second optical state as the new service interval elapses. The first segment 22 changes from the first optical state 16 to the second optical state 18 when the engine has operated for ten hours after the reset button is pressed or a total of 83.1 hours in the example shown in FIGS. 12A and 12B.

Figure 13A:
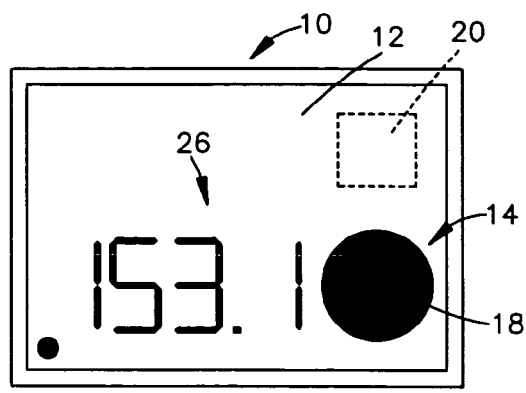
FIG. 13A is a schematic representation of an hour meter with all of the segments in a second optical state to provide a graphic indication that service is due.
Figure 13B:
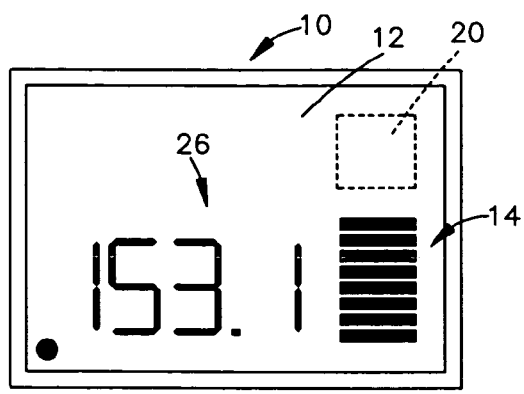
FIG. 13B is a schematic representation of an hour meter with all of the segments in a second optical state to provide a graphic indication that service is due.
Figure 14A:
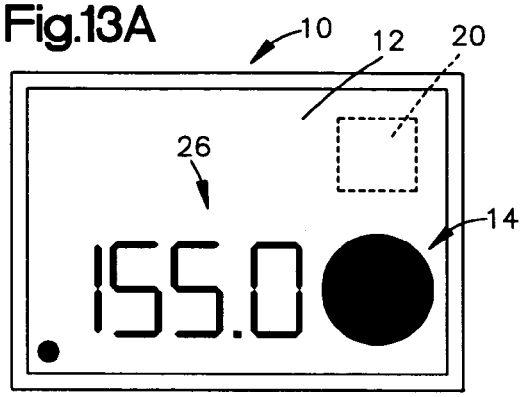
FIG. 14A is a schematic representation of an hour meter with all of the segments in a second optical state to provide a graphic indication that service is due.
Figure 14B:
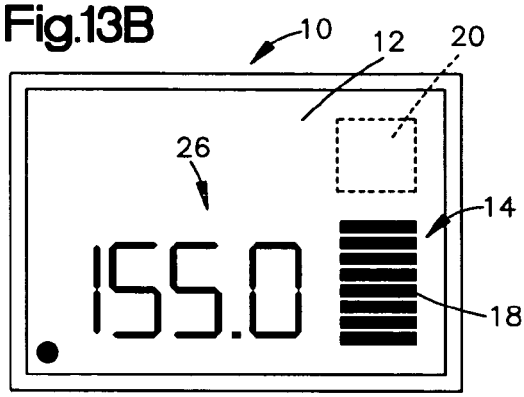
FIG. 14B is a schematic representation of an hour meter with all of the segments in a second optical state to provide a graphic indication that service is due.
Figure 15A:
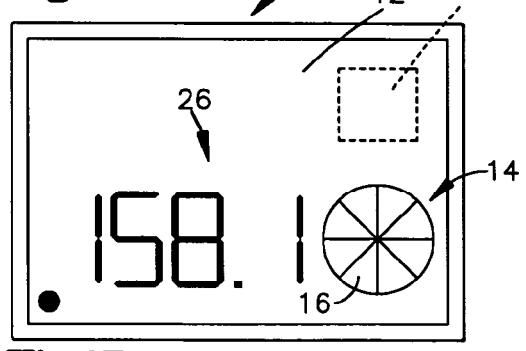
FIG. 15A is a schematic representation of an hour meter with a plurality of segments reset to the first optical state.
Figure 15B:
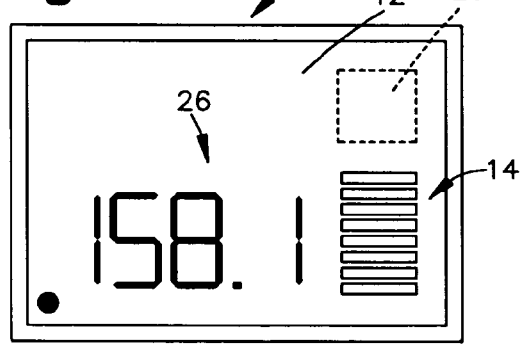
FIG. 15B is a schematic representation of an hour meter with a plurality of segments reset to the first optical state.
Figure 16A:
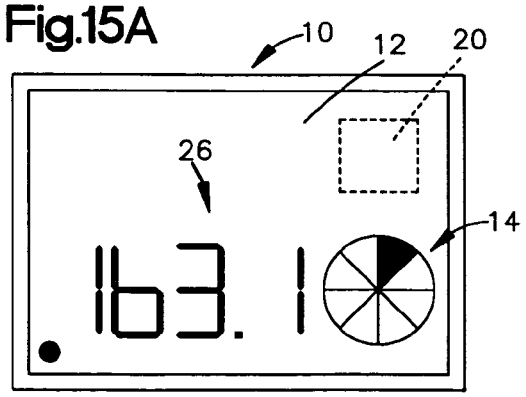
FIG. 16A is a schematic representation of an hour meter with one segment in a second optical state to provide a graphic indication of a time remaining in a service interval.
Figure 16B:
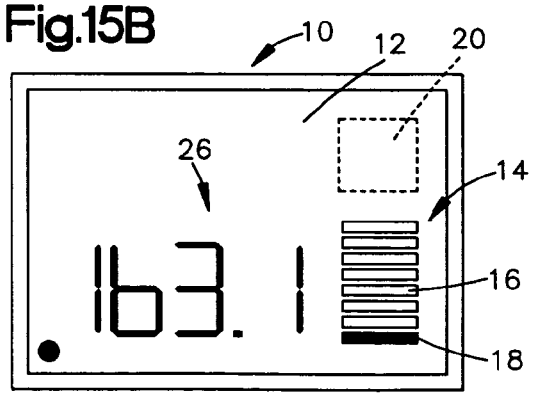
FIG. 16B is a schematic representation of an hour meter with one segment in a second optical state to provide a graphic indication of a time remaining in a service interval.

Referring to FIGS. 13A and 13B all eight segments are in the second optical state when eighty hours elapse after the reset switch is pressed. The segments remain in the second optical state until the switch 46 is actuated or for a given period of time to provide a reminder to the user that service is due. In FIGS. 14A and 14B all of the segments 14 are still in the second optical state 18 when the engine has operated for approximately eighty-two hours after the reset button was pressed. The drive resets the plurality of segments 14 back to the first optical state 16 when a predetermined engine operation time after the service time interval elapses. For example, in FIGS. 15A and 15B all of the segments 14 have been reset by the drive to the first optical state 16 when the engine has operated for eighty-five hours after the reset button was pressed. A new service time interval begins at the end of the previous service time interval. In the example provided by the FIGS. 11A–16A and 11B–16B a new service time interval begins when the engine has operated for eighty hours after the reset button was pressed. Referring to FIGS. 16A and 16B the first segment 22 changes from the first optical state 16 to the second optical state 18 when the engine has operated for ten hours for ten hours after the new service interval began or a total of 163.1 hours in the example.

Figure 18:
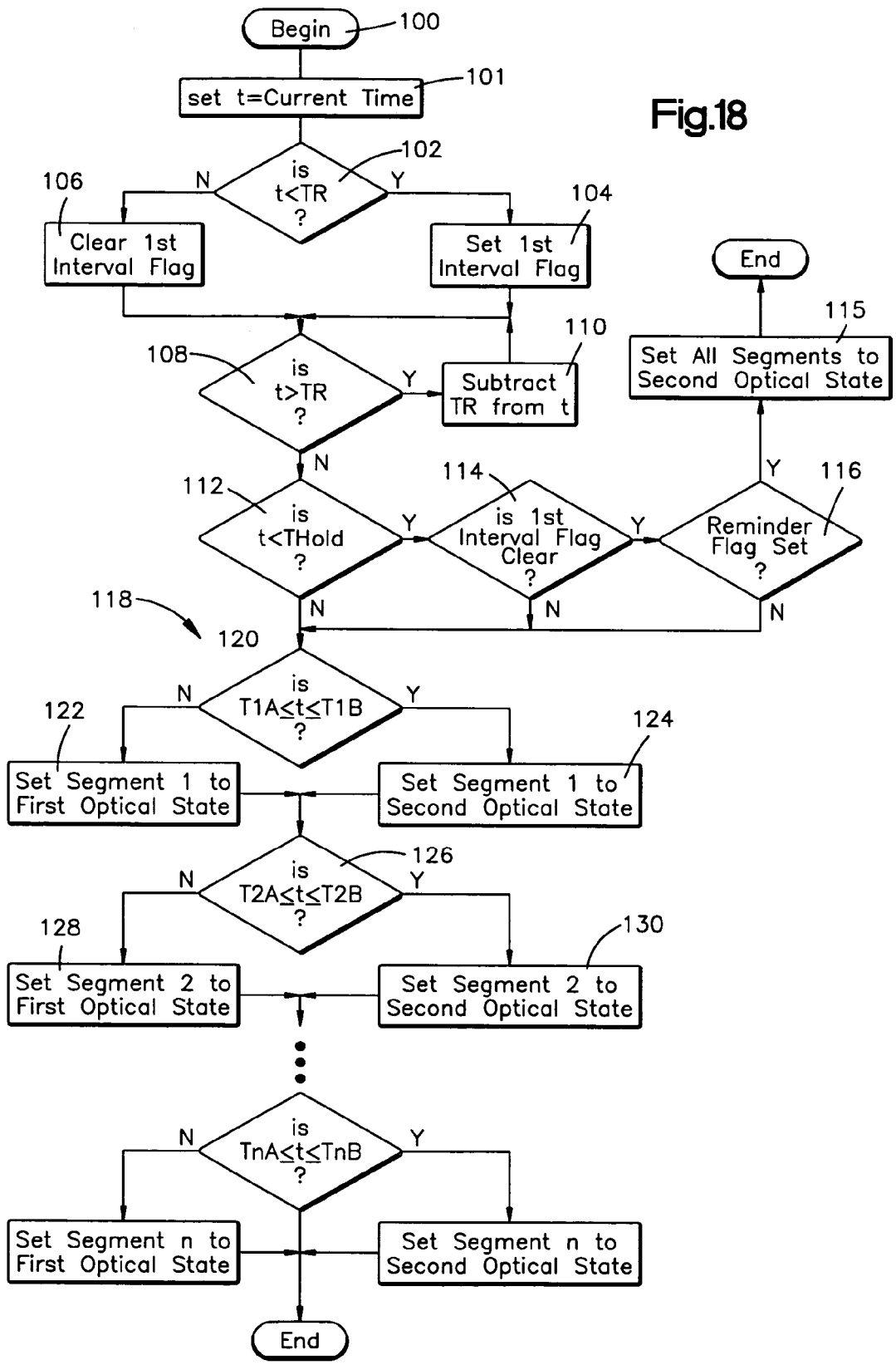
FIG. 18 is a flow chart that illustrates operation of a control for an hour meter that does not include a service interval reset switch.

FIG. 18 is a flow chart that illustrates operation of a drive for an hour meter that does not include a reset button. The operation of the drive starts 100 by setting 101 the time t to the current time recorded and/or displayed by the hour meter. The drive then determines 102 whether the time t is less than the service time interval TR. If the time t is less than the service time interval TR, a first interval flag is set 104. If the time t is not less than the service time interval TR, a first interval flag is cleared 106. The first interval flag indicates that the present service time interval is the first service time interval of the hour meter. For example, if the first service time interval is eighty hours, the first interval flag is set until the hour meter indicates that more than eighty service hours have elapsed. The drive then determines 108 whether the time t is greater than the service time interval TR. If the time t is greater than the service time interval TR, the service time interval is recursively subtracted 110 from the time t, until the time t is not greater than the service time interval. As a result, the time t is reduced from the actual hours of service indicated by the hour meter to the time in a given service interval.

The drive then determines 112 whether the time t is greater than a time THold. The time THold is the time the segments remain in the second optical state to provide a reminder that service is due after the service time interval elapses. If the time t is less than the time THold, the drive determines 114 whether the first interval flag is clear and determines 116 whether a reminder flag is set. The reminder flag determines whether a visual reminder will be provided for the period of time THold after the service time interval TR has elapsed. In the embodiment illustrated by the flow chart, the visual reminder comprises maintaining all the segments in the second optical state for the period of time TR. The visual reminder could also comprise flashing the segments for the period of time TR after the service interval has elapsed. Determining whether the first interval flag is clear prevents the visual reminder from appearing shortly after the meter is installed. If the first interval flag is clear and the reminder flag is set, all the segments are set 115 to the second optical state and the drive recursively restarts 100 the operation until the time t in the given service interval is greater than the period of time THold.

Once the time t in the given service interval is greater than or equal to time THold, or the first interval flag is set or the reminder flag is not set, the drive individually sets 118 the optical state of each of the segments. In the exemplary embodiment, each of the n segment are set to the second optical state for a period of time in the service interval. For each of the n segments, this period of time starts at a predetermined time TnA in a service interval (the $n^{th}$ segment is set to the second optical state) and ends at a predetermined time TnB in the service interval (the $n^{th}$ segment is changed back to the first optical state). The drive determines 120 whether the time t is in the time interval T1A to T1B when the first segment is to be in the second optical state. If the time t is not in the interval T1A to T1B, the first segment is set 122 to the first optical state. If the time t is in the interval T1A to T1B, the first segment is set 124 to the second optical state. The drive determines 126 whether the time t is in the time interval T2A to T2B when the second segment is to be in the second optical state. If the time t is not in the interval T2A to T2B, the second segment is set 128 to the first optical state. If the time t is in the interval T2A to T2B, the second segment is set 130 to the second optical state. The optical state of the remainder of the n segments is set in this manner. After all of the n segments are set, the drive restarts 100 the operation. In one embodiment, the values of the times TnA, TnB are functions of the segment numbers n. For example, TnA could be defined as follows:

TnA=(n−1)TA; where TA is the amount of time logged from when TnA turns to the second state to when Tn+1A turns to the second state. For example, if TA=10 hrs then T1A=0, T2A=10 hrs, T3A=20 hrs ... TnA=10 (n−1)hrs.

As is noted above, the drive can maintain each segment in the second optical state while the remainder of the service time interval elapses and additional segments are changed to the second optical state to provide the visual appearance of a bar graph or a pie graph. This can be done by setting the time TnB each of the n segments change back to the first optical state to the service time interval TR, keeping each of the segments in the second optical state until the end of the service time interval.

Figure 19:
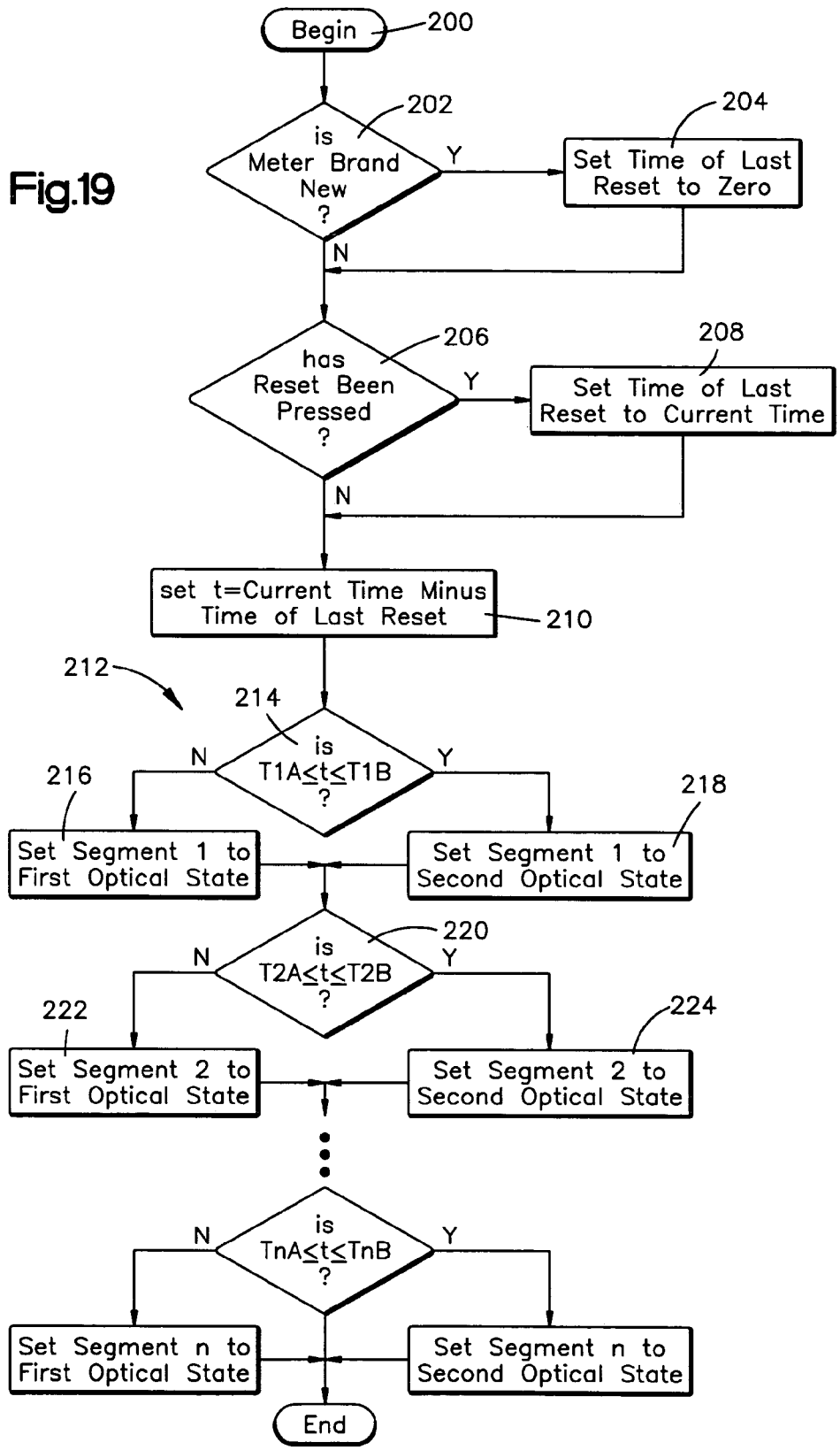
FIG. 19 is a flow chart that illustrates operation of a control for an hour meter that includes a service interval reset switch.

Alternatively, the drive can change a segment in the second optical state back to the first optical state when the next portion of the service time interval elapses and the next segment changes from the first optical state to the second optical state to provide the visual appearance of a sweeping hand of an analog clock or a needle of a gauge. This can be done by setting the time TnB each of the n segments change back to the first optical state to the time Tn+1A the next segment changes to the second optical state. For example, the time T1B the first segment changes back to the first optical state is set to the time T2A the second segment changes to the second optical state. The time T2B the second segment changes back to the first optical state is set to the time T3A the third segment changes to the second optical state, and so on. In the illustrated embodiment, when the optical states of the segments are controlled to provide the visual appearance of a sweeping hand, all the segments may be set 115 the second optical state for a period of time THold to provide a visual reminder that service is due if the reminder flag is set. FIG. 19 is a flow chart that illustrates operation of a drive for an hour meter includes a reset button. The operation of the drive starts 200 by determining 202 whether the meter is new and/or newly installed. If the meter is new a time of last reset is set 204 to zero. The drive then determines 206 whether the reset button has been pressed. If the reset button has been pressed, the drive sets 208 the time of last reset to the current time. The drive then sets 210 the time t to the current time minus the time of last reset. The drive individually sets 212 the optical state of each of the segments. Each of the n segments are set based on the time t. For each of the n segments, the segments are set to the second optical state if the time t is within a period of time defined by the predetermined time TnA the $n^{th}$ segment is set to the second optical state and the predetermined time TnB the $n^{th}$ segment is changed back to the first optical state. The drive determines 214 whether the time t is in the time interval T1A to T1B when the first segment is to be in the second optical state. If the time t is not in the interval T1A to T1B, the first segment is set 216 to the first optical state. If the time t is in the interval T1A to T1B, the first segment is set 218 to the second optical state. The drive determines 220 whether the time t is in the time interval T2A to T2B when the second segment is to be in the second optical state. If the time t is not in the interval T2A to T2B, the second segment is set 222 to the first optical state. If the time t is in the interval T2A to T2B, the second segment is set 224 to the second optical state. The optical state of the remainder of the n segments is set in this manner. After all of the n segments are set, the drive restarts 200 the operation.

As is noted above, the drive can maintain each segment in the second optical state while the remainder of the service time interval elapses and additional segments are changed to the second optical state to provide the visual appearance of a bar graph or a pie graph. Alternatively, the drive can change a segment in the second optical state back to the first optical state when the next portion of the service time interval elapses and the next segment changes from the first optical state to the second optical state to provide the visual appearance of a sweeping hand of an analog clock or a needle of a gauge.

In one embodiment, the segments remain in the second optical state for a given period of time to provide a reminder to the user that service is due and then reset to the first optical state even though the reset button has not been pressed. In this embodiment, the drive may employ the algorithm illustrated by FIG. 18 after the service time interval is elapsed. One modification to the algorithm illustrated by FIG. 18 would be that the time t would not be set 101 to the current time. Rather, the time t from the algorithm illustrated by FIG. 19 would be used in the algorithm illustrated by FIG. 18. The algorithm illustrated by FIG. 18 would be employed until the time THold the reminder is provided lapses. The drive then reverts back to the algorithm illustrated by FIG. 19.

In one embodiment, illustrated by FIG. 20, the display shows two sets 250,252 of segments. The first optical state of the first set 250 is dark and the second optical state is light. The first optical state of the second set 252 is light and the second optical state is dark. The first and second sets of segments provide the appearance of material in an upper half 254 of an hour glass emptying into a lower half 256. In the illustrated embodiment, each segment in the upper half is paired with a corresponding segment in the lower half. As time elapses each pair 258 of segments changes from the first optical state to the second optical state. As a result, the initially dark segments in the upper half appear to move into the lower half as time elapses. An indicator having all the segments in the upper half in the dark sate indicates that service is "full" or does not need to be performed. An indicator having all the segments in the lower half in the dark state indicates that service is "empty" or needs to be performed.

Figure 21A:
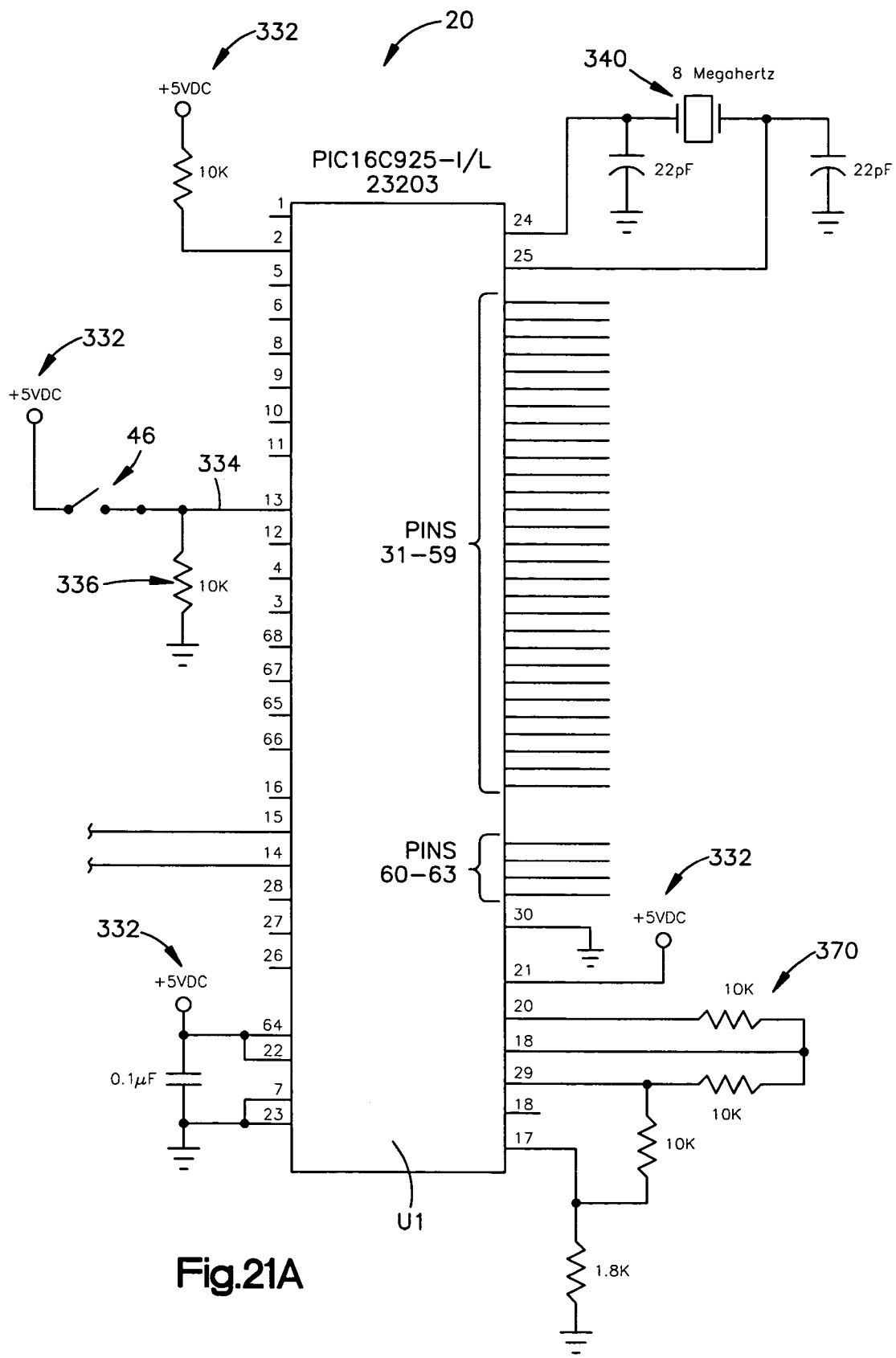
FIGS. 21A–21D depict a schematic of circuitry for activating a liquid crystal display.
Figure 21C:
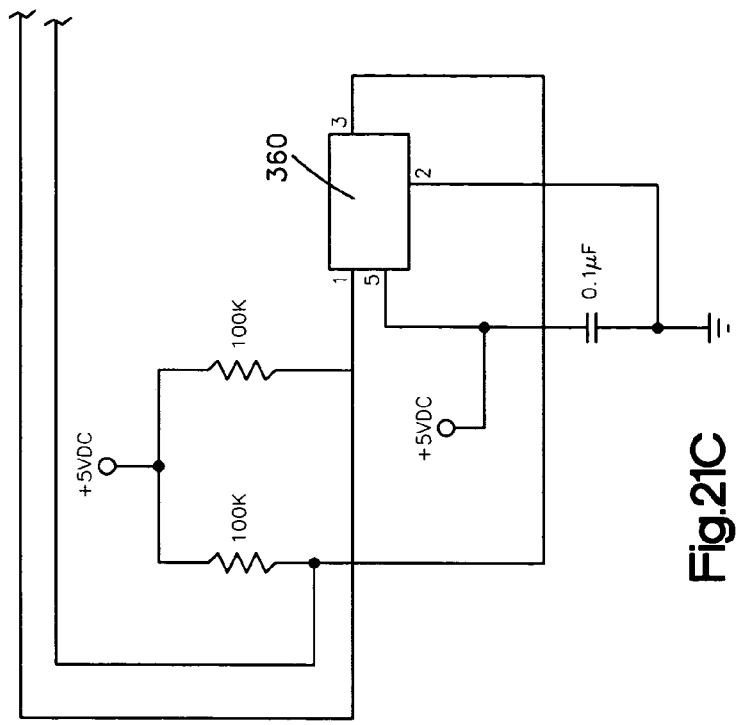
Figure 21B:
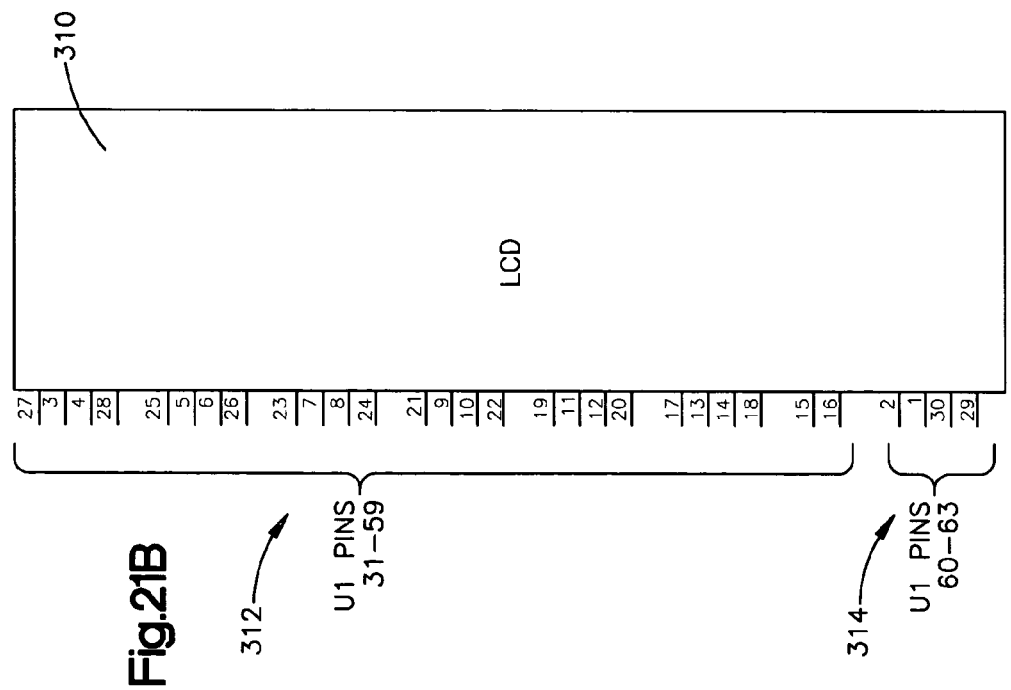

FIGS. 21A–21D depict circuitry for activating a custom liquid crystal display 310 (FIG. 21B) that contains the liquid crystal display elements shown in FIGS. 1A–16B. Referring to FIG. 21B, an exemplary custom liquid crystal display 310 has a plurality of discrete element inputs 312 and four back plane inputs 314. As is well known in the art, by activating the inputs 312 and back plane inputs 314 to apply a suitable voltage across the liquid crystal material contained within the display 310, a controlled combination of elements can be made to change state to achieve a desired display configuration.

Figure 21D:
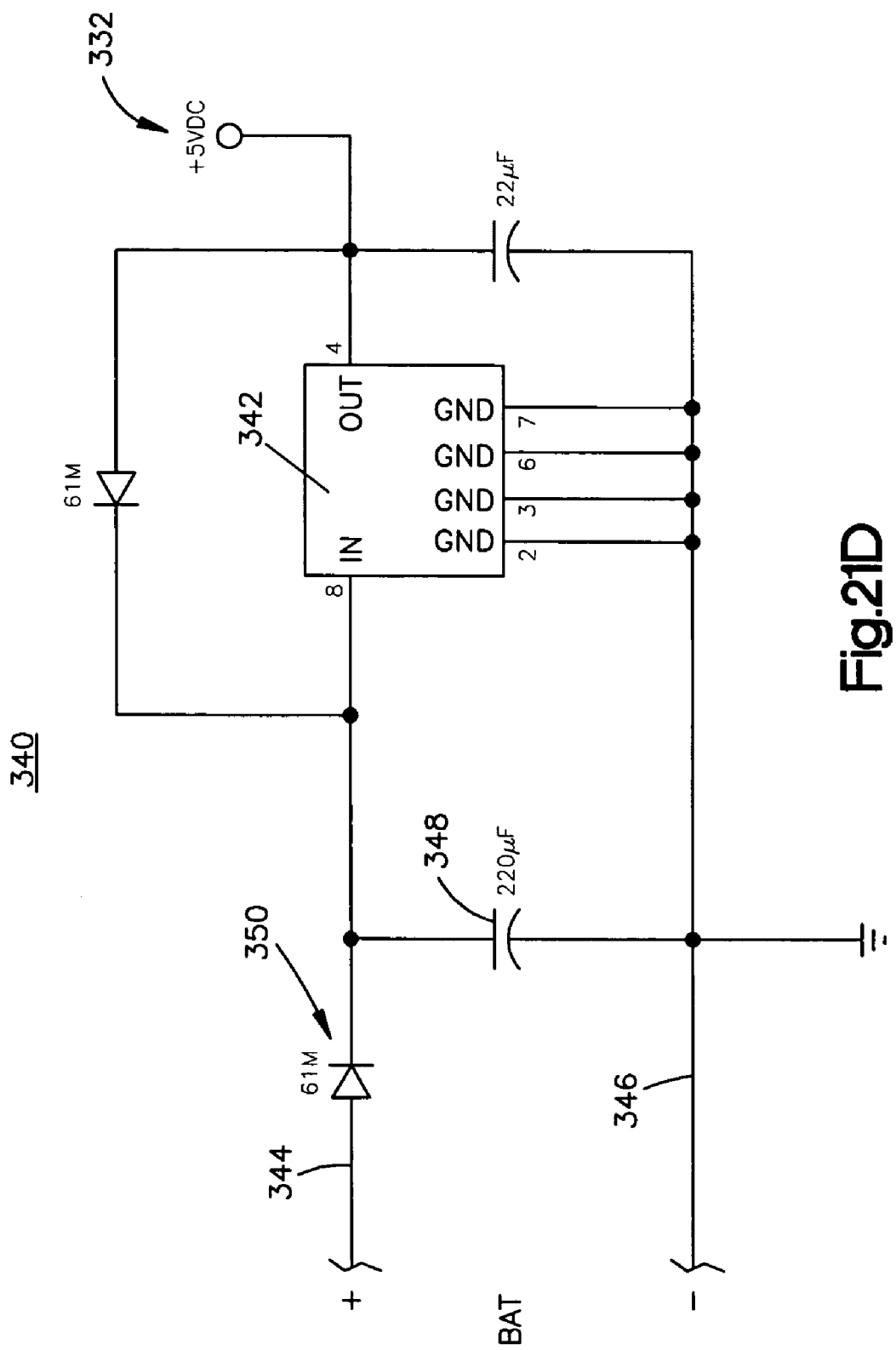

The display 310 is coupled to a model PIC 16C925-I/L (Commercially available from Microchip) display driver circuit 20 (See FIG. 21A). A five volt input 332 for powering the driver circuit 20 is created by a power supply circuit 340 (FIG. 21D). The driver circuit 20 contains or is in communication with non-volatile memory for instructions that provide an operating system that implements the control flowchart of FIGS. 18 and/or 19. A reset input 334 is normally maintained in a low state by a ground connection through a resistor 336. A momentary switch 46 is closed to reset the timer for the incremental service reminder function maintained by the driver circuit. Closing the reset switch 46 causes the driver circuit 20 to reset the service interval segments 14 of the display.

The drive circuit 20 is coupled to a crystal oscillator 340 which oscillates at a frequency of 8 Megahertz and allows the drive circuit 20 to maintain accurate timing for accurate display actuation. The operating system instructions count signal oscillations from the crystal oscillator 340 and convert input pulses at inputs coupled across the oscillator 340 to seconds, minutes, hours etc.

The display driver circuit 20 receives a five volt power signal from the power supply 340 of FIG. 21D. This power supply 340 includes voltage regulator 342 which steps down a battery signal appearing across two inputs 344, 346. The battery inputs are coupled across a capacitor 348 that filters extraneous noise signals from the inputs of the voltage regulator 342. A diode 350 protects the circuit from damage in the event of a reverse connection of the battery across the power supply.

So long as voltage from the power supply 340 is applied to the display drive circuit 20 the operating system counts pulses and maintains an accurate indication of elapsed time. When power is removed from the drive circuit, the drive circuit stores the then current time in a non-volatile memory (EEROM) circuit 360 coupled to the drive circuit. When power is next applied, the drive circuit retrieves the stored time value from the circuit 360, begins counting oscillator signals and adds to the then current time that was retrieved from the circuit 360.

The display drive circuit 20 is coupled to a resistor network 370. Discrete resistors in the network 370 are empirically determined to best activate or energize the liquid crystal materials of the custom display circuit with an appropriate drive signal for achieving good contrast between on and off states of the liquid crystal material.

While the present invention has been described with a degree of particularity, it is the intent that the invention include all modifications and alterations from the disclosed embodiments falling within the spirit or scope of the appended claims.

I claim:

1. An hour meter having a display that provides a visual indication of a total time a lawn or garden tractor engine has operated and a visual indication of engine operation time remaining in a predetermined service time interval, comprising:
   a) a plurality of segments on said display that are selectively displayed in a first optical state or a second optical state;
   b) a power supply mounted to the lawn or garden tractor; and
   c) a display drive coupled to the power supply that displays said plurality of segments in said first optical state at a beginning of a predetermined service time interval, said display drive including a timer for monitoring intervals the display drive is energized and which changes the optical state of a first segment from the first optical state to the second optical state when the timer reaches a predetermined service time interval, said drive incrementally changes the state of a remainder of the plurality of segments from said first optical state to said second optical state as additional portions of the predetermined service time interval elapse to visually display the amount of engine operation time remaining in the predetermined service time interval.

2. The hour meter of claim 1 wherein said first segment remains in said second optical state while said remainder of the predetermined service time interval elapses.

3. The hour meter of claim 1 wherein said display drive resets the plurality of segments to the first optical state after the predetermined service time interval elapses.

4. The hour meter of claim 1 wherein all of said plurality of segments are displayed in said second optical state when said predetermined service time interval elapses.

5. The hour meter of claim 4 wherein all of said segments remain in said second optical state for a predetermined time period after the service time interval elapses to provide a visual indication that service is due.

6. The hour meter of claim 5 wherein said drive resets the plurality of segments to the first optical state after the predetermined time elapses.

7. The hour meter of claim 1 further wherein said display indicates an amount of engine operation time remaining with the plurality of segments for a next service time interval after the service time interval has elapsed.

8. The hour meter of claim 1 further comprising a switch for manually resetting said predetermined service time interval and said plurality of segments to said first optical state.

9. The hour meter of claim 1 further comprising a switch for manual resetting of the plurality of segments to the first optical state, said drive automatically resets the plurality of segments to the first optical state if said switch is not actuated and a predetermined engine operation time elapses after the predetermined service time interval elapses.

10. An hour meter having a display that provides a visual indication of a total time a lawn or garden tractor engine has operated and a visual indication of engine operation time remaining in a predetermined service time interval, comprising:
   a) a display having a plurality of segments that are selectively displayed in a first optical state or a second optical state to form a graph;
   b) a power supply for energizing the display;
   c) a display drive coupled to the power supply that displays said plurality of segments in said first optical state at a beginning of a predetermined service interval, said display drive including a timer that monitors time intervals the display drive is energized and incrementally changes the state of each of the segments of the graph from said first optical state to said second optical state as the predetermined service time interval elapses to visually display the amount of engine operation time remaining in the predetermined service time interval; and p1 d) a switch for manual resetting the predetermined service interval and the plurality of segments to the first optical state, wherein said drive automatically resets the plurality of segments to the first optical state if said switch is not actuated and a predetermined engine operation time elapses after the predetermined service time interval transpires.

11. In an hour meter having a display that provides a visual indication of a total time a lawn or garden tractor engine has operated, a method of visually displaying an amount of engine operation time remaining in a predetermined service time interval, comprising:
  a) selectively displaying a plurality of segments on said display powered by a lawn or garden tractor power supply in a first optical state or a second optical state;
  b) displaying said plurality of segments in said first optical state at a beginning of a predetermined engine service time interval;
  c) timing engine operation based on intervals the display is energized by the power supply and maintaining an accumulated engine operation time;
  d) changing the optical state of a first segment from the first optical state to the second optical state when the accumulated engine operation time reaches a given portion of the predetermined engine service time interval has elapsed; and
  e) incrementally changing the state of a remainder of the plurality of segments of the graph from said first optical state to said second optical state as the accumulated engine operation reaches additional portions of the predetermined engine service time interval elapse to visually displaying the amount of engine operation time remaining in the predetermined engine service time interval.

12. The method of claim 11 wherein said plurality if segments define a graph.

13. The method of claim 11 wherein said first segment remains in said second optical state while said remainder of the predetermined service time interval elapses.

14. The method of claim 11 further comprising resetting the plurality of segments to the first optical state after the predetermined service time interval elapses.

15. The method of claim 14 wherein all of said segments remain in said second optical state for a predetermined engine operation time after the service time interval elapses to provide a visual indication that service is due.

16. The method of claim 11 wherein all of said plurality of segments are displayed in said second optical state when said predetermined service time interval elapses.

17. The method of claim 16 further comprising resetting the plurality of segments to the first optical state when the predetermined engine operation time after the service time interval elapses.

18. The method of claim 11 further comprising visually displaying an amount of engine operation time remaining with the plurality of segments for a next service time interval after the service time interval has elapsed.

19. The method of claim 11 further comprising providing for manual and automatic resetting of the plurality of segments to the first optical state.

20. The method of claim 19 wherein the manual resetting is performed by pressing a reset button on the hour meter.

21. The method of claim 19 wherein the automatic resetting is occurs when a predetermined engine operation time after the predetermined service time interval elapses.

22. The method of claim 11 further comprising manually resetting said predetermined service time and said plurality of segments to said first optical state.

23. In an hour meter having a display that provides a visual indication of a total time an engine has operated, a method of providing a visual indication of engine operation time remaining in a predetermined service time interval, comprising:
  a) providing a graph on said display having a plurality of segments that are selectively displayed in a first optical state or a second optical state;
  b) displaying said plurality of segments in said first optical state at a beginning of a predetermined service interval;
  c) incrementally changing the state of each of the segments of the graph from said first optical state to said second optical state as the predetermined service time interval elapses to visually display the amount of engine operation time remaining in the predetermined service time interval;
  d) resetting the predetermined service time interval and the plurality of segments to the first optical state when a manual reset switch is actuated; and
  e) automatically resetting the predetermined service time interval and the plurality of segments to the first optical state if said switch is not actuated during the predetermined service time interval and a predetermined engine operation time elapses after the predetermined service time interval elapses.

* * * * *